(12) United States Patent
Wang et al.

(10) Patent No.: US 9,796,287 B2
(45) Date of Patent: Oct. 24, 2017

(54) ELECTRIC VEHICLE AND DISCHARGING APPARATUS THEREOF

(71) Applicants: SHENZHEN BYD AUTO R&D COMPANY LIMITED, Shenzhen (CN); BYD COMPANY LIMITED, Shenzhen (CN)

(72) Inventors: Wei Wang, Shenzhen (CN); Hongjun Wang, Shenzhen (CN); Zhen Li, Shenzhen (CN); Ming Liu, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 405 days.

(21) Appl. No.: 14/370,039

(22) PCT Filed: Dec. 31, 2012

(86) PCT No.: PCT/CN2012/087997
§ 371 (c)(1),
(2) Date: Jun. 30, 2014

(87) PCT Pub. No.: WO2013/097798
PCT Pub. Date: Jul. 4, 2013

(65) Prior Publication Data
US 2015/0008866 A1    Jan. 8, 2015

(30) Foreign Application Priority Data

Dec. 31, 2011  (CN) .......................... 2011 1 0458395
Dec. 31, 2011  (CN) ..................... 2011 2 0571932 U
(Continued)

(51) Int. Cl.
*B60L 11/18* (2006.01)
*H02J 7/00* (2006.01)
(Continued)

(52) U.S. Cl.
CPC .......... *B60L 11/1851* (2013.01); *B60L 1/003* (2013.01); *B60L 1/006* (2013.01); *B60L 3/003* (2013.01);
(Continued)

(58) Field of Classification Search
CPC .. H02J 7/0054; B60L 11/1842; Y02T 10/7077
(Continued)

(56) References Cited

U.S. PATENT DOCUMENTS 4,920,475 A  4/1990 Rippel
5,471,655 A  11/1995 Kivari
(Continued)

FOREIGN PATENT DOCUMENTS

CN    1625014 A    6/2005
CN    1634725 A    7/2005
(Continued)

OTHER PUBLICATIONS

English language abstract for CN201594757U extracted from espacenet.com on Jun. 30, 2015, 1 page.
(Continued)

*Primary Examiner* — Samuel Berhanu
*Assistant Examiner* — Tarikh Rankine
(74) *Attorney, Agent, or Firm* — Anova Law Group, PLLC

(57) ABSTRACT

A discharging apparatus for an electric vehicle and an electric vehicle are provided. The discharging apparatus comprises: an AC charging interface; a charging connection device, configured to transmit an AC output from the AC charging interface to another electric vehicle; an instrument,
(Continued)

configured to send a discharging preparation instruction; a controller, configured to detect whether the charging connection device is connected with the AC charging interface, and if yes, to emit a PWM wave and to switch to an external discharging mode; a battery manager, configured to control an external discharging circuit in a high-voltage distribution box of the electric vehicle to be connected after the controller switches to the external discharging mode; a power battery, configured to provide a DC via the external discharging circuit.

20 Claims, 9 Drawing Sheets

(30) Foreign Application Priority Data

| Jun. 7, 2012 | (CN) | ............................. 2012 1 0185660 |
| Jun. 7, 2012 | (CN) | ....................... 2012 2 0266009 U |
| Jun. 27, 2012 | (CN) | ............................. 2012 1 0214502 |
| Jun. 27, 2012 | (CN) | ....................... 2012 2 0303636 U |

(51) Int. Cl.
*H02J 7/02* (2016.01)
*H02J 7/34* (2006.01)
*H04B 3/54* (2006.01)
*B60L 3/00* (2006.01)
*B60L 1/00* (2006.01)
*H02J 3/32* (2006.01)

(52) U.S. Cl.
CPC ........... *B60L 3/0046* (2013.01); *B60L 3/0069* (2013.01); *B60L 11/18* (2013.01); *B60L 11/1803* (2013.01); *B60L 11/1805* (2013.01); *B60L 11/185* (2013.01); *B60L 11/1809* (2013.01); *B60L 11/1811* (2013.01); *B60L 11/1812* (2013.01); *B60L 11/1814* (2013.01); *B60L 11/1816* (2013.01); *B60L 11/1818* (2013.01); *B60L 11/1838* (2013.01); *B60L 11/1842* (2013.01); *B60L 11/1861* (2013.01); *B60L 11/1872* (2013.01); *H02J 3/32* (2013.01); *H02J 7/007* (2013.01); *H02J 7/0036* (2013.01); *H02J 7/0054* (2013.01); *H02J 7/0055* (2013.01); *H02J 7/0063* (2013.01); *H02J 7/0065* (2013.01); *H02J 7/0068* (2013.01); *H02J 7/02* (2013.01); *H02J 7/345* (2013.01); *H04B 3/542* (2013.01); *B60L 2210/12* (2013.01); *B60L 2210/14* (2013.01); *B60L 2210/30* (2013.01); *B60L 2210/40* (2013.01); *B60L 2210/42* (2013.01); *B60L 2230/12* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/12* (2013.01); *B60L 2260/22* (2013.01); *B60L 2260/26* (2013.01); *B60L 2270/147* (2013.01); *B60L 2270/20* (2013.01); *H02J 7/022* (2013.01); *H02J 2007/0067* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7088* (2013.01); *Y02T 10/7225* (2013.01); *Y02T 10/7233* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
USPC .................................................. 320/103, 109
See application file for complete search history.

(56) References Cited

U.S. PATENT DOCUMENTS

| 5,642,270 | A * | 6/1997 | Green .................... B60L 11/126 |
| | | | 363/17 |
| 5,994,874 | A | 11/1999 | Hirose |
| 6,163,135 | A | 12/2000 | Nakayama et al. |
| 6,690,719 | B1 | 2/2004 | Raphaeli et al. |
| 7,317,300 | B2 * | 1/2008 | Sada .................... G01R 31/3668 |
| | | | 320/104 |
| 7,411,362 | B2 | 8/2008 | Ishikawa |
| 7,489,106 | B1 | 2/2009 | Tikhonov |
| 8,427,103 | B2 | 4/2013 | Ohtomo |
| 8,487,582 | B2 | 7/2013 | King et al. |
| 8,922,050 | B2 | 12/2014 | Fassnacht |
| 2003/0197425 | A1* | 10/2003 | Montante ................ H02M 1/10 |
| | | | 307/26 |
| 2003/0220026 | A1 | 11/2003 | Oki et al. |
| 2004/0017175 | A1 | 1/2004 | Lee et al. |
| 2004/0026140 | A1 | 2/2004 | Suzuki et al. |
| 2004/0062059 | A1 | 4/2004 | Cheng et al. |
| 2004/0145338 | A1 | 7/2004 | Nakamura et al. |
| 2005/0182535 | A1* | 8/2005 | Huang .................... H04L 43/50 |
| | | | 701/31.4 |
| 2005/0231172 | A1 | 10/2005 | Kato et al. |
| 2006/0244411 | A1* | 11/2006 | Wobben .............. B60L 11/1811 |
| | | | 320/104 |
| 2007/0075661 | A1 | 4/2007 | Hsu |
| 2008/0180058 | A1 | 7/2008 | Patel et al. |
| 2008/0185999 | A1 | 8/2008 | Matsukawa et al. |
| 2009/0066291 | A1 | 3/2009 | Tien et al. |
| 2009/0079389 | A1 | 3/2009 | Ohtomo |
| 2009/0096424 | A1 | 4/2009 | Ambrosio et al. |
| 2009/0184681 | A1 | 7/2009 | Kuno |
| 2009/0278405 | A1 | 11/2009 | Stancu et al. |
| 2009/0295224 | A1 | 12/2009 | Kobayashi et al. |
| 2010/0007306 | A1 | 1/2010 | Fukui et al. |
| 2010/0027305 | A1 | 2/2010 | Oyobe et al. |
| 2010/0079004 | A1 | 4/2010 | Keefe |
| 2010/0091529 | A1 | 4/2010 | Jakeman et al. |
| 2010/0096918 | A1 | 4/2010 | Sawada et al. |
| 2010/0164287 | A1 | 7/2010 | Komazawa et al. |
| 2010/0181829 | A1 | 7/2010 | Ichikawa et al. |
| 2010/0214055 | A1 | 8/2010 | Fuji et al. |
| 2010/0219794 | A1 | 9/2010 | Sugimoto et al. |
| 2010/0244558 | A1 | 9/2010 | Mitsutani et al. |
| 2010/0253145 | A1 | 10/2010 | King et al. |
| 2011/0005037 | A1 | 1/2011 | Kim |
| 2011/0020174 | A1 | 1/2011 | Rauschnabel et al. |
| 2011/0040436 | A1 | 2/2011 | Yamamoto et al. |
| 2011/0050174 | A1 | 3/2011 | King et al. |
| 2011/0062962 | A1 | 3/2011 | Wolf et al. |
| 2011/0084664 | A1 | 4/2011 | White et al. |
| 2011/0115425 | A1 | 5/2011 | Olsson |
| 2011/0148353 | A1* | 6/2011 | King ........................ B60L 7/12 |
| | | | 320/109 |
| 2011/0193532 | A1* | 8/2011 | Iwanaga ................ B60K 6/445 |
| | | | 320/163 |
| 2011/0202219 | A1* | 8/2011 | Ishibashi ............. B60L 11/1809 |
| | | | 701/22 |
| 2012/0153717 | A1 | 6/2012 | Obayashi et al. |
| 2012/0263242 | A1 | 10/2012 | Heuer |
| 2012/0288016 | A1 | 11/2012 | Ichikawa |
| 2012/0299715 | A1 | 11/2012 | Ichikawa |
| 2014/0333262 | A1 | 11/2014 | Ochiai |
| 2014/0354240 | A1* | 12/2014 | Wang .................. B60L 11/1816 |
| | | | 320/136 |

(56) References Cited

U.S. PATENT DOCUMENTS

FOREIGN PATENT DOCUMENTS

| | | | |
|---|---|---|---|
| CN | 200947552 Y | 9/2007 | |
| CN | 101388560 A | 3/2009 | |
| CN | 201329816 Y | 10/2009 | |
| CN | 102025182 A | 4/2010 | |
| CN | 201594757 U | 9/2010 | |
| CN | 201752075 U | 2/2011 | |
| CN | 101997336 A | 3/2011 | |
| CN | 201781330 U | 3/2011 | |
| CN | 102045086 A | 5/2011 | |
| CN | 102055226 A | 5/2011 | |
| CN | 201839022 U | 5/2011 | |
| CN | 201876820 U | 6/2011 | |
| CN | 201877856 U | 6/2011 | |
| CN | 102118184 A | 7/2011 | |
| CN | 201898359 U | 7/2011 | |
| CN | 102185343 A | 9/2011 | |
| CN | 102185375 A | 9/2011 | |
| CN | 102222928 A | 10/2011 | |
| CN | 102416882 A | 4/2012 | |
| CN | 202276163 U | 6/2012 | |
| CN | 102673422 A | 9/2012 | |
| CN | 202435108 U | 9/2012 | |
| CN | 202455130 U | 9/2012 | |
| CN | 102774284 A | 11/2012 | |
| CN | 102882249 A | 1/2013 | |
| CN | 102904300 A | 1/2013 | |
| EP | 0 985 570 A2 | 3/2000 | |
| EP | 1 531 075 A1 | 5/2005 | |
| EP | 2 020 726 A2 | 2/2009 | |
| EP | 2 039 560 A1 | 3/2009 | |
| EP | 2 290 778 A2 | 3/2011 | |
| JP | H06141488 A | 5/1994 | |
| JP | 2010 178431 A | 8/2010 | |
| JP | 2010252520 A | 11/2010 | |
| JP | 2011 083124 A | 4/2011 | |
| JP | 2011151717 A | 8/2011 | |
| JP | 2011 176959 A | 9/2011 | |
| JP | 2011 234470 A | 11/2011 | |
| JP | WO 2013027108 A1 * | 2/2013 | ............ B60L 3/0023 |
| WO | WO 2010 079074 A1 | 7/2010 | |
| WO | WO 2011 013388 A2 | 2/2011 | |
| WO | WO 2013 097797 A1 | 7/2013 | |
| WO | WO 2013 097801 A1 | 7/2013 | |
| WO | WO 2013 097803 A1 | 7/2013 | |
| WO | WO 2013 097825 A1 | 7/2013 | |

OTHER PUBLICATIONS

English language abstract for JP2010252520A extracted from espacenet.com on Jun. 30, 2015, 1 page.
English language abstract for CN102055226A extracted from espacenet.com on Jun. 30, 2015, 1 page.
English language abstract for CN202455130U extracted from espacenet.com on Jun. 30, 2015, 1 page.
English language abstract for CN102774284A extracted from espacenet.com on Jun. 30, 2015, 1 page.
International Search Report of WO2013097798A1 dated Mar. 14, 2013, 2 pages.
English language abstract and machine-assisted English language translation of JP H06141488 A extracted from www.espacenet.com on Aug. 9, 2016; 8 pages.
English language abstract only of EP 0 985 570 A2 extracted from www.espacenet.com on Aug. 9, 2016; see English language equivalent U.S. Pat. No. 6,163,135 A; 2 pages.
English language abstract only of EP 1 531 075 A1 extracted from www.espacenet.com on Aug. 9, 2016; see English language equivalent U.S. Pat. No. 7,411,362 B2; 2 pages.
English language abstract only of CN 1625014 A extracted from www.espacenet.com on Jun. 30, 2015; 1 pages.
English language abstract only of CN 1634725 A extracted from www.espacenet.com on Aug. 10, 2016; 1 pages.
English language abstract only of CN 200947552 Y extracted from www.espacenet.com on Jun. 30, 2015; 1 pages.
English language abstract and machine-assisted English language translation of EP 2 020 726 A2 extracted from www.espacenet.com on Aug. 9, 2016; 21 pages.
English language abstract only of CN 101388560 A extracted from www.espacenet.com on Jun. 30, 2015; 1 pages.
English language abstract only of EP 2 039 560 A1 extracted from www.espacenet.com on Aug. 9, 2016; see English language equivalent U.S. Pat. No. 8,427,103 B2; 1 pages.
English language abstract only of CN 201329816 Y extracted from www.espacenet.com on Jun. 30, 2015; 1 pages.
English language abstract only of CN 102025182 A extracted from www.espacenet.com on Jun. 30, 2015; 1 pages.
English language abstract only of WO 2010/079074 A1 extracted from www.espacenet.com on Aug. 10, 2016; see English language equivalent U.S. Pat. No. 8,922,050 B2; 1 pages.
English language abstract and machine-assisted English language translation of JP 2010 178431 A extracted from www.espacenet.com on Aug. 9, 2016; 14 pages.
English language abstract and machine-assisted English language translation of CN 201752075 U extracted from mvw.espacenet.com on Jun. 3, 2016; 11 pages.
English language abstract only of EP 2 290 778 A2 extracted from www.espacenet.com on Aug. 10, 2016; see English language equivalent U.S. Pat. No. 8,487,582 B2; 2 pages.
English language abstract and machine-assisted English language translation of CN 101997336 A extracted from www.espacenet.com on Aug. 9, 2016; 10 pages.
English language abstract and machine-assisted English language translation of CN 201781330 U extracted from www.espacenet.com on Aug. 10, 2016; 8 pages.
English language abstract and machine-assisted English language translation of JP 2011 083124 A extracted from www.espacenet.com on Aug. 9, 2016; 9 pages.
English language abstract and machine-assisted English language translation of CN 102045086 A extracted from www.espacenet.com on Aug. 9, 2016; 5 pages.
English language abstract and machine-assisted English language translation of CN 201839022 U extracted from www.espacenet.com on Aug. 10, 2016; 7 pages.
English language abstract and machine-assisted English language translation of CN 201876820 U extracted from www.espacenet.com on Aug. 10, 2016; 4 pages.
English language abstract and machine-assisted English language translation of CN 201877856 U extracted from www.espacenet.com on Aug. 10, 2016; 8 pages.
English language abstract and machine-assisted English language translation of CN 102118184 A extracted from www.espacenet.com on Aug. 9, 2016; 7 pages.
English language abstract and machine-assisted English language translation of CN 201898359 U extracted from www.espacenet.corn on Aug. 10, 2016; 4 pages.
English language abstract and machine-assisted English language translation of JP 2011 176959 A extracted from www.espacenet.com on Aug. 9, 2016; 12 pages.
English language abstract and machine-assisted English language translation of CN 102185343 A extracted from www.espacenet.com on Aug. 9, 2016; 8 pages.
English language abstract and machine-assisted English language translation of CN 102185375 A extracted from www.espacenet.com on Aug. 9, 2016; 10 pages.
English language abstract and machine-assisted English language translation of CN 102222928 A extracted from www.espacenet.com on Aug. 9, 2016; 12 pages.
English language abstract and machine-assisted English language translation of JP 2011 234470 A extracted from www.espacenet.com on Jun. 3, 2016; 15 pages.
English language abstract and machine-assisted English language translation of CN 102416882 A extracted from www.espacenet.com on Jun. 3, 2016; 5 pages.

(56) References Cited

OTHER PUBLICATIONS

English language abstract and machine-assisted English language translation of CN 202276163 U extracted from www.espacenet.com on Aug. 10, 2016; 8 pages.
English language abstract only of CN 202435108 U extracted from www.espacenet.com on Jun. 30, 2015; 1 pages.
English language abstract and machine-assisted English language translation of CN 102673422 A extracted from www.espacenet.com on Aug. 9, 2016; 10 pages.
English language abstract and machine-assisted English language translation of CN 102882249 A extracted from www.espacenet.com on Aug. 9, 2016; 12 pages.
English language abstract and machine-assisted English language translation of CN 102904300 A extracted from www.espacenet.com on Aug. 9, 2016; 12 pages.
International Search Report of WO 2013 097797 A1 dated Mar. 14, 2013; 2 pages.
International Search Report of WO 2013 097801 A1 dated Mar. 22, 2013; 3 pages.
Supplementary European Search Report for Application No. EP 12 86 1486 dated Nov. 17, 2015; 10 pages.
International Search Report of WO 2013 097803 A1 dated Mar. 20, 2013; 3 pages.
International Search Report of WO 2013 097825 A1 dated Mar. 20, 2013; 3 pages.

\* cited by examiner

ELECTRIC VEHICLE AND DISCHARGING APPARATUS THEREOF

CROSS-REFERENCE TO RELATED APPLICATION

This U.S. application claims priority under 35 U.S.C 371 to, and is a U.S. National Phase application of, the International Patent Application No. PCT/CN2012/088098, filed Dec. 31, 2012, which claims the benefit of prior Chinese Application No. 201110458395.6 filed Dec. 31, 2011, No. 201120571932.3 filed Dec. 31, 2011, No. 201210185660.2 filed Jun. 7, 2012, No. 201220266009.3 filed Jun. 7, 2012, No. 201220303636.X filed Jun. 27, 2012, and No. 201210214502.5 filed Jun. 27, 2012. The entire contents of the above-mentioned patent applications are incorporated by reference as part of the disclosure of this U.S. application.

FIELD

The present disclosure relates to a vehicle control technology field, and more particularly to an electric vehicle and a discharging apparatus thereof.

BACKGROUND

With the development of science and technology, fuel vehicles are being replaced by environment friendly and energy saving electric vehicles. However, the popularization of the electric vehicles encounters some problems, among which high driving mileage and fast charging technology has become major problems in the promotion of electric vehicles.

Currently, large-capacity batteries are used in most electric vehicles. However, although these batteries may enhance the endurance time of the electric vehicle, they make a charging time too long. Although a specialized DC (direct current) charging station may charge a battery quickly, problems such as high cost and large occupied area make the popularity of such an infrastructure encounter a certain difficulty. Moreover, because of a limited space of another electric vehicle, an in-vehicle charger may not satisfy the requirement of a charging power due to the limitation of its volume.

A charging solution currently used in the market comprises the following solutions.

Solution (1)

As shown in FIGS. 1-2, an in-vehicle charging or discharging device in this solution mainly includes a three-phase power transformer 1', a three-phase bridge circuit 2' consisting of six thyristor elements, a constant-voltage control device AUR, and a constant-current control device ACR. However, this solution causes a serious waste of space and cost.

Solution (2)

As shown in FIG. 3, an in-vehicle charging or discharging device in this solution includes two charging sockets 15', 16' to adapt to the single-phase/three-phase charging, which increases the cost. A motor driving loop includes a filtering module consisting of an inductor L1' and a capacitor C1'. When a motor is driven, a loss of a three-phase current is generated when it flows through the filtering module, which causes a waste of an electric quantity of a battery. With this solution, during the charging or discharging operation, an inverter 13' rectifies/inverts an AC (alternating current) electricity, and the voltage after the rectifying/inverting may not be adjusted, such that an operation voltage range of the battery is narrow.

Therefore, most AC charging technologies currently used in the market are a single-phase charging technology, which has disadvantages including low charging power, long charging time, large hardware volume, single function, restriction by voltage levels of different regional grids, etc.

In addition, the electric vehicle only supplies the electric energy stored in the power battery to the motor so that the motor drive another electric vehicle to move. While the another electric vehicle is in OK gear, after the another electric vehicle collects the gear signal and the throttle signal, the motor driving controller inverts DC supplied by the battery into AC and outputs the AC to the motor. Then the motor rotates to drive the another electric vehicle.

With the development of science and technology, fuel vehicles are being replaced by environment friendly and energy saving electric vehicles. However, the popularization of the electric vehicles encounters some problems. Due to the effect of the road condition or the users' habits, the driving distance of the another electric vehicle which is calculated by the battery manager may have certain errors. Therefore, it is possible that the electric quantity of the power battery is insufficient or even has been exhausted before reaching the destination, which may make the another electric vehicle unable to move, thus involving the user in trouble.

SUMMARY

Embodiments of the present disclosure seek to solve at least one of the problems existing in the related art to at least some extent.

Accordingly, a first object of the present disclosure is to provide a discharging apparatus for an electric vehicle. The electric vehicle broadens an application range of electric vehicles, such that the electric vehicle may temporarily be used as a charging device to charge an electric vehicle with insufficient or exhausted energy. Thus the problem that electric vehicles are unable to drive on half way due to insufficient or exhausted electric quantity of the battery may be solved. A second object of the present disclosure is to provide an electric vehicle.

In order to achieve the above objects, embodiments of a first aspect of the present disclosure provide a discharging apparatus for an electric vehicle. The discharging apparatus for an electric vehicle includes: an AC charging interface; a charging connection device, having a first terminal connected with the AC charging interface of the electric vehicle and a second terminal connected with another electric vehicle and configured to transmit an AC output from the AC charging interface to the another electric vehicle; an instrument, configured to send a discharging preparation instruction after receiving a trigger signal; a controller, configured to communicate with the instrument and to detect whether the charging connection device is connected with the AC charging interface after receiving the discharging preparation instruction, and if yes, to emit a PWM wave and to switch to an external discharging mode; a battery manager, configured to communicate with the controller and to control an external discharging circuit in a high-voltage distribution box of the electric vehicle to be connected after the controller switches to the external discharging mode; a power battery, connected with the high-voltage distribution box and configured to provide a DC via the external discharging circuit in the high-voltage distribution box; in which the controller is configured to detect whether the another electric vehicle is fully charged, and if no, to the controller converts the DC provided by the external discharging circuit into the AC and to output the AC to the AC charging interface so as to discharge to the another electric vehicle.

The discharging apparatus for the electric vehicle according to embodiments of the present disclosure is set at a normal charging mode and holds for an external connection and power supply. The another electric vehicle to be charged is in OFF gear, while the electric vehicle for supplying power needs to be in OK gear with P gear and set at a mode of discharging to another electric vehicle to be charged. Then the controller of the electric vehicle switches to a charging pile state to supply power to another electric vehicle after connection. The discharging apparatus for the electric vehicle broadens an application range of electric vehicles, such that the electric vehicle may temporarily be used as the charging device to charge an electric vehicle with insufficient or exhausted energy, thus the problem that electric vehicles are unable to drive on half way due to insufficient or exhausted electric quantity of the battery may be solved.

Embodiments of a second aspect of the present disclosure provide an electric vehicle. The electric vehicle includes the discharging apparatus for an electric vehicle according to embodiments of the first aspect of the present disclosure.

The electric vehicle according to embodiments of the present disclosure is set at a normal charging mode and holds for an external connection and power supply. The another electric vehicle to be charged is in OFF gear, while the electric vehicle for supplying power needs to be in OK gear with P gear and is set at a mode of discharging to another electric vehicle to be charged. Then the controller of the electric vehicle switches to a charging pile state to supply power to another electric vehicle after connection. The electric vehicle broadens an application range of electric vehicles, such that the electric vehicle may temporarily be used as a charging device to charge an electric vehicle with insufficient or exhausted energy, thus the problem that electric vehicles are unable to drive on half way due to insufficient or exhausted electric quantity of the battery may be solved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
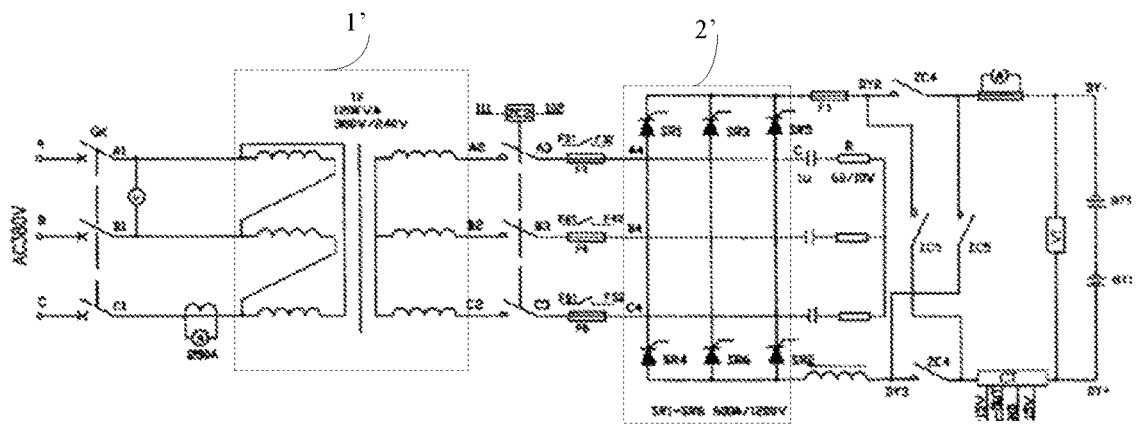
FIG. 1 is a circuit diagram of a conventional in-vehicle charging-discharging device.
Figure 2:
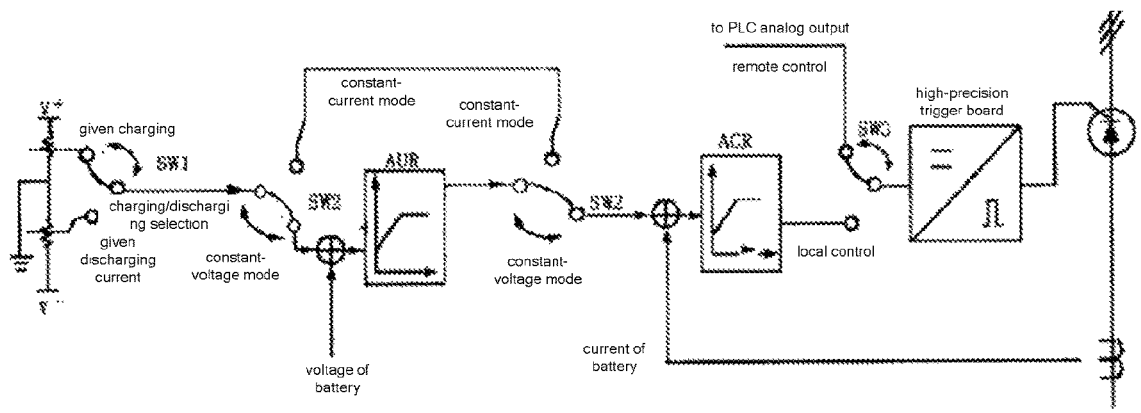
FIG. 2 is a diagram of a conventional in-vehicle charging-discharging device.
Figure 3:
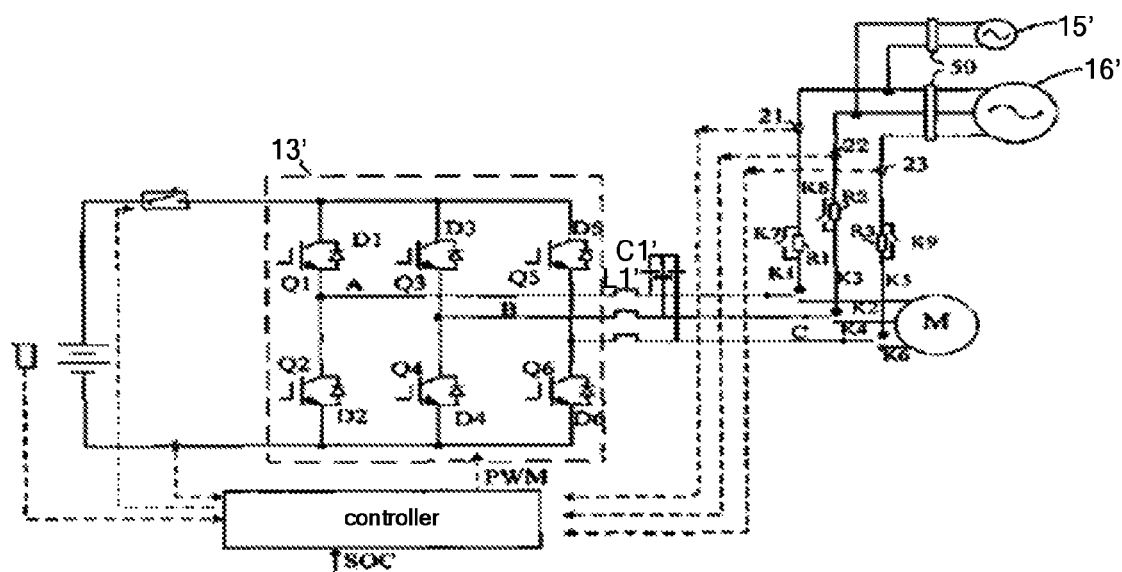
FIG. 3 is a circuit diagram of another conventional in-vehicle charging-discharging device.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 4:
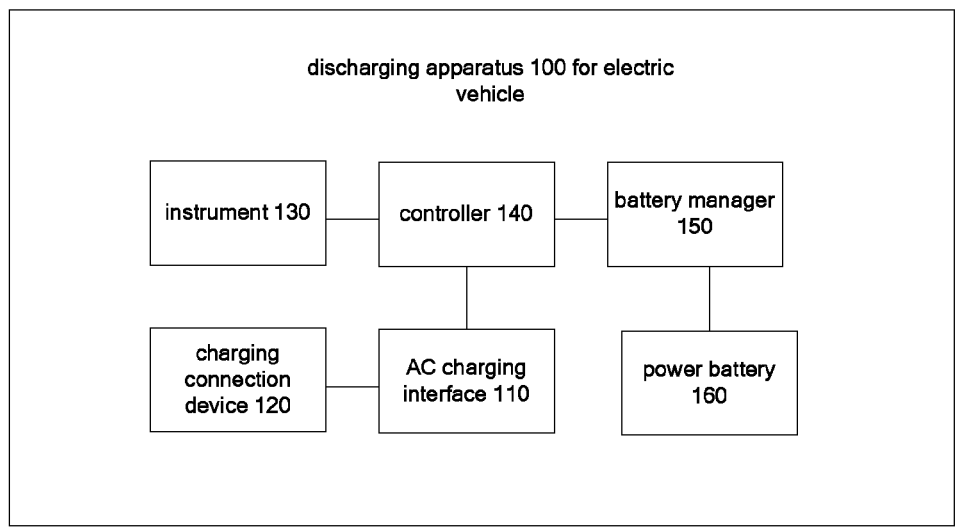
FIG. 4 is a block diagram of a discharging apparatus for an electric vehicle according to an embodiment of the present disclosure.

FIG. 4 is a block diagram of a discharging apparatus for an electric vehicle according to an embodiment of the present disclosure.

As shown in FIG. 4, a discharging apparatus 100 for an electric vehicle according to an embodiment of the present disclosure includes: an AC charging interface 110, a charging connection device 120, an instrument 130, a controller 140, a battery manager 150 and a power battery 160.

The charging connection device 120 has a first terminal connected with the AC charging interface 110 and a second terminal connected with another electric vehicle, and is configured to transmit an AC output from the AC charging interface 110 to the another electric vehicle.

Figure 5:
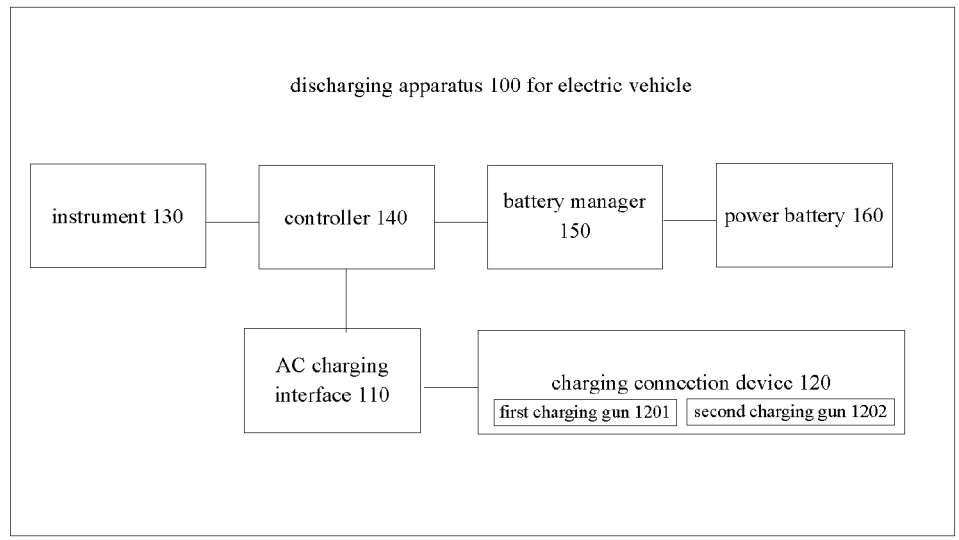
FIG. 5 is a block diagram of a discharging apparatus for an electric vehicle according to another embodiment of the present disclosure.

Specifically, as shown in FIG. 5, the discharging apparatus 100 for the electric vehicle according to another embodiment of the present disclosure is shown. The charging connection device 120 further includes a first charging gun 1201 and a second charging gun 1202.

The first charging gun 1201 is located at a first terminal of the charging connection device and is connected with the AC charging interface 110 of the electric vehicle.

The second charging gun 1202 is located at the second terminal of the charging connection device and is connected with an AC charging interface 110 of another electric vehicle.

The controller 140 is configured to communicate with the instrument 130 and to detect whether the charging connection device 120 is connected with the AC charging interface 110 after receiving a discharging preparation instruction sent from the instrument 130 when the instrument 130 receives a trigger signal. If the charging connection device 120 is connected with the AC charging interface 110, the controller 140 emits a PWM (pulse width modulation) wave and switches to an external discharging mode. In some embodiments of the present disclosure, the controller 140 is further configured to detect whether an electric quantity of the electric vehicle is greater than a predetermined value, and if yes, it is determined to allow the electric vehicle to discharge externally. In some embodiments of the present disclosure, the external discharge may be a three-phase external discharge or a single-phase external discharge.

Specifically, the instrument 130 and the controller 140 are communicated via a CAN bus of a local area network of the controller 140, and the controller 140 and the battery manager 150 are communicated via the CAN bus.

Furthermore, after it is determined whether the charging connection device 120 is connected with the AC charging interface 110, the controller 140 emits the PWM wave via a CP pin. The controller 140 determines whether another electric vehicle is fully charged by detecting a voltage of the CP pin. If the voltage of the CP pin reaches a predetermined voltage, it is determined that another electric vehicle has been fully charged, in which the predetermined voltage is 6V. The controller 140 is further configured to determine whether the electric vehicle is currently in P gear after it is determined that the charging connection device 120 is connected with the AC charging interface 110, and if yes, the controller 140 switches to the external discharging mode. The controller 140 is further configured to detect in real-time whether an internal circuit of the controller has a fault and to detect in real-time whether another electric vehicle has a fault during discharging. The controller 140 is further configured to stop outputting the AC if it is determined that the internal circuit of the controller has a fault and/or another electric vehicle has a fault. The controller 140 is further configured to stop outputting the AC after receiving a discharging finish instruction from the instrument 130. The controller 140 is further configured to detect a current discharging current in real-time. The controller 140 is further configured to stop outputting the AC, if it is determined that the charging connection device 120 is disconnected with the AC charging interface 110 or another electric vehicle is fully charged. The AC may be 380V/50 Hz, or 400V/50 Hz (Europe), or 480V/60 Hz (US).

The battery manager 150 is configured to communicate with the controller 140 and to control an external discharging circuit in a high-voltage distribution box of the electric vehicle to be connected after the controller switches to the external discharging mode.

Specifically, the battery manager 150 is further configured to detect in real-time a current electric quantity of the power battery and whether the power battery 160 has a fault, if it is determined that the power battery 160 has a fault, the battery manager 150 sends a battery fault instruction to the controller 140, and the controller 140 stops outputting the AC after receiving the battery fault instruction.

The power battery 160 is connected with the high-voltage distribution box and is configured to provide a DC by the external discharging circuit in the high-voltage distribution box.

The controller 140 is further configured to detect whether another electric vehicle is fully charged, and if no, the controller 140 inverts DC provided by the external discharging circuit into AC and outputs the AC to the AC charging interface 110 so as to discharge to another electric vehicle, i.e. to charge another electric vehicle.

The discharging apparatus for the electric vehicle according to embodiments of the present disclosure is set at a normal charging mode and holds for an external connection and power supply. The another electric vehicle to be charged is in OFF gear, while the electric vehicle for supplying power needs to be in OK gear with P gear and is set at a mode of discharging to another electric vehicle to be charged. Then the controller of the electric vehicle switches to a charging pile state to supply power to another electric vehicle after connection. The discharging apparatus for the electric vehicle broadens an application range of electric vehicles, such that the electric vehicle may temporarily be used as a charging device to charge an electric vehicle with insufficient or exhausted energy. Thus the problem that electric vehicles are unable to drive on half way due to insufficient or exhausted electric quantity of the battery may be solved.

Figure 6:
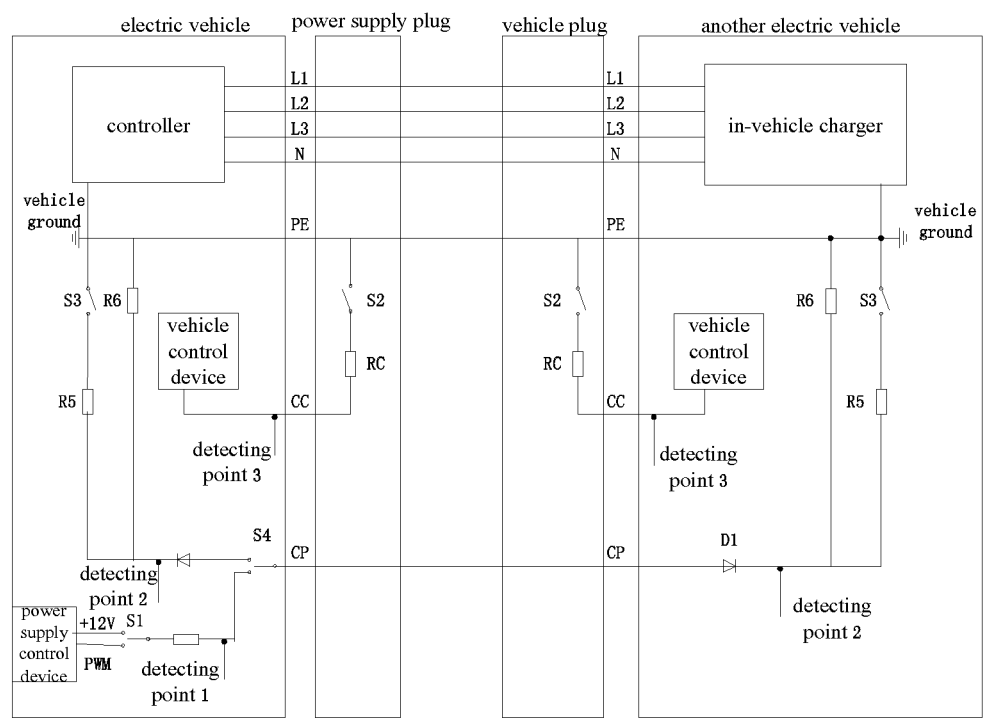
FIG. 6 is a connecting topological diagram showing an electric vehicle discharging to another electric vehicle.

FIG. 6 is a connecting topological diagram showing an electric vehicle discharging to another electric vehicle.

As shown in FIG. 6, the connecting topological diagram showing an electric vehicle discharging to another electric vehicle includes: an electric vehicle for supplying power, including a controller, a vehicle control device and a power supply control device; a power supply plug; another electric vehicle including in-vehicle charger and a vehicle control device; a vehicle plug.

Specifically, a power supply apparatus is connected with the vehicle plug of another vehicle via the power supply plus, so as to charge another electric vehicle. A power system of the electric vehicle detects a CP signal via a detecting point 2 and detects a CC signal via a detecting point 3, while the power supply apparatus detects the CP signal via a detecting point 1 and detects the CC signal via the detecting point 3. Moreover, after the charging is finished, internal switches S2 in both the power supply plug and in the vehicle plug are controlled to turn off.

In another embodiment of the present disclosure, a plurality of power systems connected in parallel can be used in the electric vehicle to charge the power battery. For example, two power systems connected in parallel are used to charge the power battery, and the two power systems use a common controller module. During the electric vehicle for supplying power discharging to another electric vehicle, the another electric vehicle to be charged is in OFF gear and is set at a normal charging mode for holding for an external connection and power supply. While the electric vehicle for supplying power needs to be in OK gear with P gear and is set at a mode of discharging to another electric vehicle. Then the controller switches to a charging pile state to supply power to another electric vehicle according to national standards after connection.

Furthermore, a function of the electric vehicle for supplying power in the system is similar to a three-phase AC charging pile, which may output a three-phase AC required by another electric vehicle. For example, electric vehicles sold in Chinese Mainland may supply three-phase AC of 380V/50 Hz with a maximum output current of 63 A.

Figure 7:
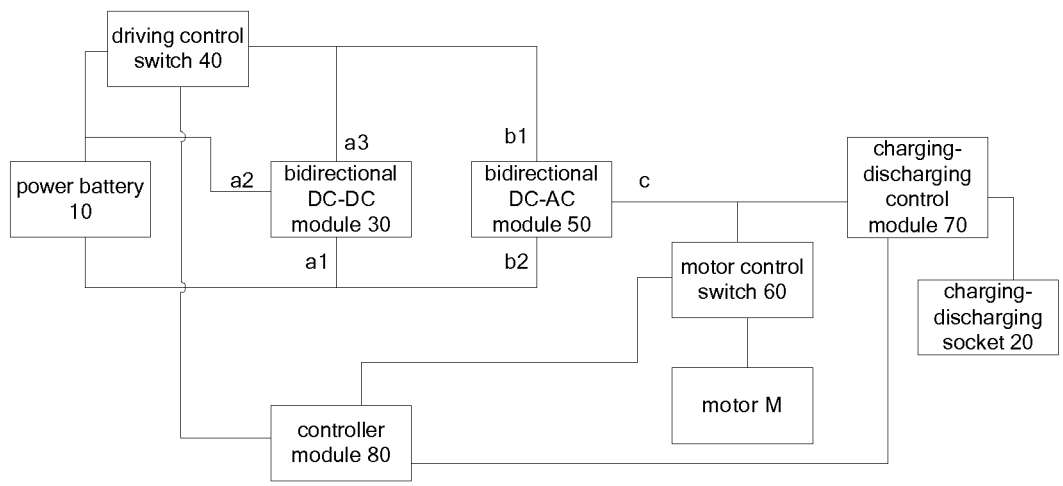
FIG. 7 is a block diagram of a power system for an electric vehicle.

FIG. 7 is a block diagram of a power system for an electric vehicle.

The power system for the electric vehicle according to an embodiment of the present disclosure includes a power battery 10, a charging-discharging socket 20, a bidirectional DC-DC module 30, a driving control switch 40, a bidirectional DC-AC module 50, a motor control switch 60, a charging-discharging control module 70 and a controller module 80. In some embodiments of the present disclosure, the external discharging circuit in the high-voltage distribution box refers to the charging-discharging control module 70, the bidirectional DC-DC module 30 and the bidirectional DC-AC module 50. When the power system is controlled to be at an external discharging state, the external discharging circuit may externally discharge.

The bidirectional DC-DC module 30 has a first DC terminal a1 connected with a first terminal of the power battery 10, and a second DC terminal a2 connected with a second terminal of the power battery 10. The first DC terminal a1 is a common DC terminal for an input to and an output from the bidirectional DC-DC module 30. The driving control switch 40 has a first terminal connected with the second terminal of the power battery 10, and a second terminal connected with a third DC terminal a3 of the bidirectional DC-DC module 30. The bidirectional DC-AC module 50 has a first DC terminal b1 connected with the second terminal of the driving control switch 40, and a second DC terminal b2 connected with the first terminal of the power battery 10. The motor control switch 60 has a first terminal connected with an AC terminal c of the bidirectional DC-AC module 50, and a second terminal connected with a motor M. The charging-discharging control module 70 has a first terminal connected with the AC terminal c of the bidirectional DC-AC module 50, and a second terminal connected with the charging-discharging socket 20. The controller module 80 is connected with the driving control switch 40, the motor control switch 60 and the charging-discharging control module 70 respectively, and configured to control the driving control switch 40, the motor control switch 60 and the charging-discharging control module 70 according to a current operation mode of the power system.

Further, in some embodiments, the current operation mode of the power system may include a driving mode and a charge-discharge mode. When the current operation mode of the power system is a driving mode, the controller module 80 controls the driving control switch 40 to turn on in order to stop the bidirectional DC-DC module 30, controls the motor control switch 60 to turn on to drive the motor M normally, and controls the charging-discharging control module 70 to turn off. It should be noted that, although in some embodiments, the motor control switch 60 includes three switches connected with a three-phase input of the motor, in other embodiments, the motor control switch 60 may also include two switches connected with a two-phase input of the motor, or even one switch, provided that the control on the motor may be realized. Therefore, other embodiments will not be described in detail herein. When the current operation mode of the power system is a charge-discharge mode, the controller module 80 controls the driving control switch 40 to turn off to start the bidirectional DC-DC module 30, controls the motor control switch 60 to turn off to remove the motor M, and controls the charging-discharging control module 70 to turn on in such a way that an external power source may charge the power battery 10 normally. The first DC terminal a1 and the third DC terminal a3 of the bidirectional DC-DC module 30 are connected with a positive terminal and a negative terminal of a DC bus respectively.

Figure 8:
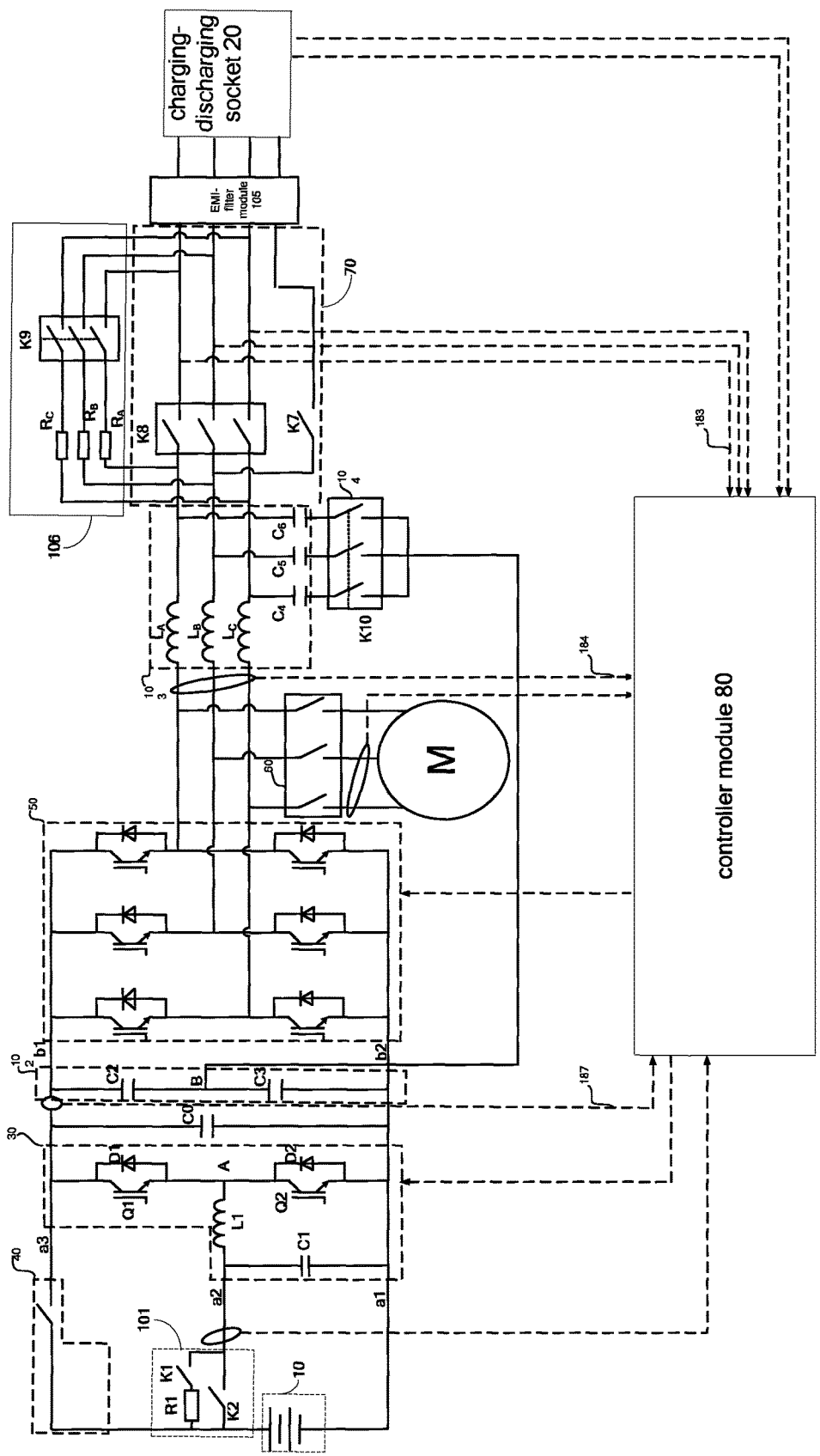
FIG. 8 is a topological diagram of a power system for an electric vehicle.

FIG. 8 is a topological diagram of a power system for an electric vehicle.

As shown in FIG. 8, the power system for the electric vehicle further includes a first pre-charging control module 101. The first pre-charging control module 101 has a first terminal connected with the second terminal of the power battery 10, and a second terminal connected with the second DC terminal a2 of the bidirectional DC-DC module 30, and is configured to pre-charge a capacitor C1 in the bidirectional DC-DC module 30 and a bus capacitor C0 connected between the first DC terminal a1 and the third DC terminal a3 of the bidirectional DC-DC module 30. The first pre-charging control module 101 includes a first switch K1, a first resistor R1 and a second switch K2. The first switch K1 has a first terminal connected with the second DC terminal a2 of the bidirectional DC-DC module 30. The first resistor R1 has a first terminal connected with a second terminal of the first switch K1, and a second terminal connected with the second terminal of the power battery 10. The second switch K2 is connected in parallel with a circuit consisting of the first resistor R1 and the first switch K1 which are connected in series. When the power system is powered on, the controller module 80 controls the first switch K1 to turn on to pre-charge the capacitor C1 in the bidirectional DC-DC module 30 and the bus capacitor C0; and when a voltage across the bus capacitor C0 is a predetermined multiple of a voltage of the power battery 10, the controller module 80 controls the first switch K1 to turn off and controls the second switch K2 to turn on.

As shown in FIG. 8, the bidirectional DC-DC module 30 further includes a first switching transistor Q1, a second switching transistor Q2, a first diode D1, a second diode D2, a first inductor L1 and a first capacitor C1. The first switching transistor Q1 and the second switching transistor Q2 are connected in series to form a circuit, and said circuit is connected between the first DC terminal a1 and the third DC terminal a3 of the bidirectional DC-DC module 30. The first switching transistor Q1 and the second switching transistor Q2 are controlled by the controller module 80. A first node A is defined between the first switching transistor Q1 and the second switching transistor Q2. The first diode D1 is connected with the first switching transistor Q1 in inverse-parallel. The second diode D2 is connected with the second switching transistor Q2 in inverse-parallel. The first inductor L1 has a first terminal connected with the first node A, and a second terminal connected with the second terminal of the power battery 10. The first capacitor C1 has a first terminal connected with the second terminal of the first inductor L1, and a second terminal connected with the first terminal of the power battery 10.

Moreover, as shown in FIG. 8, the power system for the electric vehicle further includes a leakage current reducing module 102. The leakage current reducing module 102 is connected between the first DC terminal a1 and the third DC terminal a3 of the bidirectional DC-DC module 30. Specifically, the leakage current reducing module 102 includes a second capacitor C2 and a third capacitor C3. The second capacitor C2 has a first terminal connected with a first terminal of the third capacitor C3, and a second terminal connected with the first DC terminal a1 of the bidirectional DC-DC module 30, the third capacitor C3 has a second terminal connected with the third DC terminal a3 of the bidirectional DC-DC module 30, and a second node B is defined between the second capacitor C2 and the third capacitor C3.

Generally, a leakage current is large in an inverter and grid system without transformer isolation. Therefore, with the power system according to embodiments of the present disclosure, a leakage current reducing module 102 is connected between the positive terminal and the negative terminal of the DC bus, thus reducing the leakage current effectively. The leakage current reducing module 102 includes two capacitors C2 and C3 of the same type, the capacitor C2 is connected between the negative terminal of the DC bus and a three-phase AC neutral point potential, the capacitor C3 is connected between the positive terminal of the DC bus and the three-phase AC neutral point potential, and a high-frequency current may be fed back to a DC side when the power system operates, thus effectively reducing a high-frequency leakage current generated when the power system operates.

In one embodiment, as shown in FIG. 8, the power system for the electric vehicle further includes a filtering module 103, a filtering control module 104, an EMI-filter module 105 and a second pre-charging control module 106.

The filtering module 103 is connected between the bidirectional DC-AC module 50 and the charging-discharging control module 70. Specifically, as shown in FIG. 5, the filtering module 103 includes inductors $L_A$, $L_B$, $L_C$ and capacitors C4, C5, C6, and the bidirectional DC-AC module 50 may include six IGBTs (insulated gate bipolar transistor), a connection point between an upper IGBT and a lower IGBT is connected respectively with the filtering module 103 and the motor control switch 60 via a power bus.

As shown in FIG. 8, the filtering control module 104 is connected between the second node B and the filtering module 103, and controlled by the controller module 80. When the current operation mode of the power system is a driving mode, the controller module 80 controls the filtering control module 104 to turn off. The filtering control module 104 may be a capacitor switching relay, and may include a contactor K10. The EMI-filter module 105 is connected between the charging-discharging socket 20 and the charging-discharging control module 70. It should be noted that, the position of the contactor K10 in FIG. 8 is merely exemplary. In other embodiments, the contactor K10 may be located at other positions, provided that the filtering module 103 may be turned off using the contactor K10. For example, in another embodiment, the contactor K10 may also be connected between the bidirectional DC-AC module 50 and the filtering module 103.

The second pre-charging control module 106 is connected in parallel with the charging-discharging control module 70 and configured to pre-charge capacitors C4, C5, C6 in the filtering module 103. The second pre-charging control module 106 includes three resistors $R_A$, $R_B$, $R_C$ connected in series and a three-phase pre-charging switch K9.

In one embodiment, as shown in FIG. 8, the charging-discharging control module 70 further includes a three-phase switch K8 and/or a single-phase switch K7 configured to implement a three-phase charging-discharging or a single-phase charging-discharging.

In other words, when the power system is powered on, the controller module 80 controls the first switch K1 to turn on to pre-charge the first capacitor C1 in the bidirectional DC-DC module 30 and the bus capacitor C0; and when the voltage across the bus capacitor C0 is a predetermined multiple of the voltage of the power battery 10, the controller module 80 controls the first switch K1 to turn off and controls the second switch K2 to turn on. In this way, the bidirectional DC-DC module 30 and the large-capacity bus capacitor C0 directly connected between power buses (i.e. DC buses) constitute main components for implementing a battery low-temperature activation technology, which is adapted to transfer the electric energy of the power battery 10 to the large-capacity bus capacitor C0 via the bidirectional DC-DC module 30, and to transfer the electric energy stored in the large-capacity bus capacitor C0 to the power battery 10 via the bidirectional DC-DC module 30 (i.e. when charging the power battery 10) after an electric quantity of the bus capacitor C0 reaches a predetermined value. Therefore, the charging and discharging cycle of the power battery 10 makes the temperature of the power battery 10 increase to an optimum operation temperature range.

When the current operation mode of the power system is a driving mode, the controller module 80 controls the driving control switch 40 to turn on to stop the bidirectional DC-DC module 30, controls the motor control switch 60 to turn on to drive the motor M normally, and controls the charging-discharging control module 70 to turn off. In this way, a DC from the power battery 10 is inverted into an AC by means of the bidirectional DC-AC module 50, and the AC is transmitted to the motor M. The operation of the motor M can be controlled by a revolving transformer decoder technology and a space vector pulse width modulation (SVPWM) control algorithm.

When the current operation mode of the power system is a charge-discharge mode, the controller module 80 controls the driving control switch 40 to turn off to start the bidirectional DC-DC module 30, controls the motor control switch 60 to turn off to remove the motor M, and controls the charging-discharging control module 70 to turn on in such a way that an external power source such as a three-phase power source or a single-phase power source may charge the power battery 10 via the charging-discharging socket 20 normally. In other words, by detecting a charge connection signal, an AC grid electric system and relevant information on whole vehicle battery management, a controllable rectification function may be performed be means of the bidirectional DC-AC module 50, and the in-vehicle power battery 10 may be charged by the single-phase power source and/or the three-phase power source via the bidirectional DC-DC module 30.

With the power system for the electric vehicle according to embodiments of the present disclosure, the electric vehicle can be charged under a high power by means of a civil or industrial AC grid, such that a user may perform the charging efficiently, promptly, anytime and anywhere, thus saving a charging time. Moreover, a constant-voltage control device or a constant-current control device is not required, thus saving space and cost and having a wide battery operation voltage range.

Figure 9:
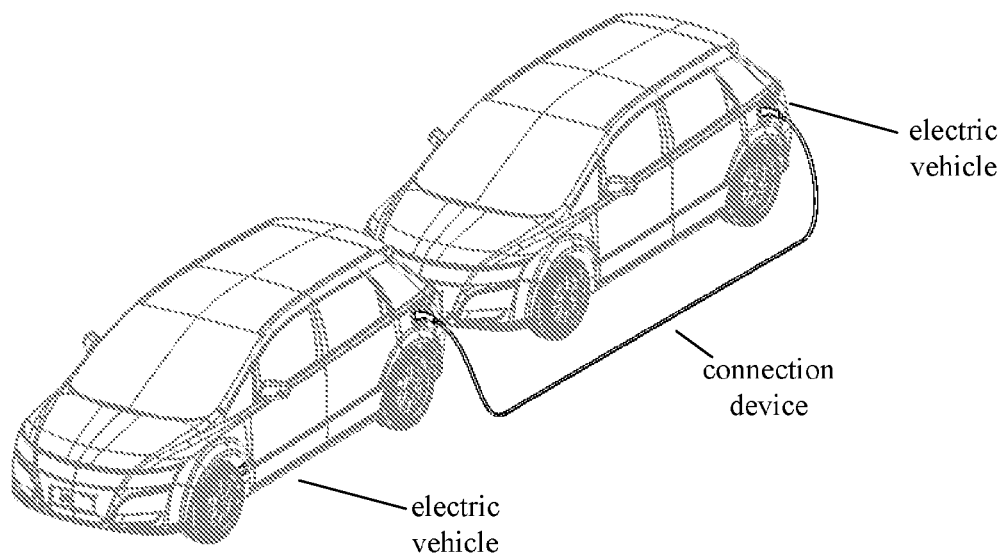
FIG. 9 is a schematic view of electric vehicles showing V-to-V (an electric vehicle discharging to another electric vehicle)

FIG. 9 is a schematic view of electric vehicles showing V-to-V.

Specifically, as shown in FIG. 9, the schematic view of electric vehicles showing V-to-V includes electric vehicles and a V-to-V discharging connection device.

Figure 10:
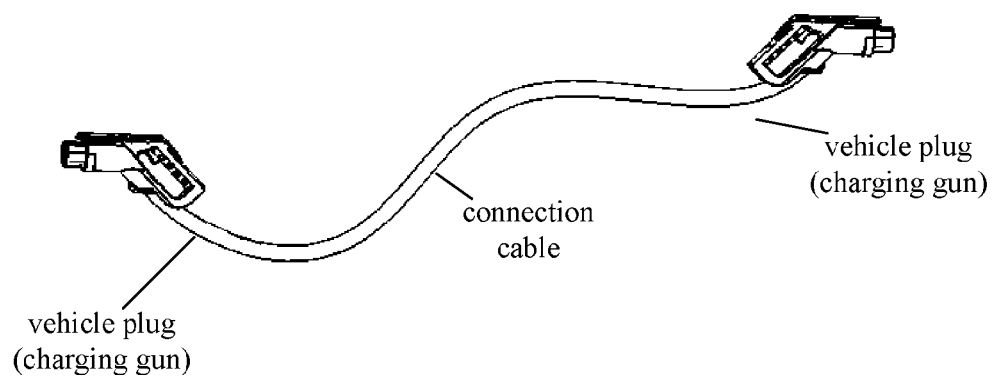
FIG. 10 is a schematic view of connecting apparatus showing V-to-V.

The V-to-V discharging connection device is mainly used to connect the two electric vehicles. FIG. 10 is a schematic view of connecting apparatus showing V-to-V. As shown in FIG. 10, two charging guns with the same state are provided at both terminals of the discharging connection device respectively, a high voltage cable conforming to standards of sales territory is connected between the two charging guns, and thus the two terminals of the discharging connection device may be exchanged to use. RC Resistances of the charging connection signals CC of both charging guns are 100Ω.

Because during the V-to-V process, the electric vehicle to be charged is charged according to standards, the electric vehicle to be charged will not be described in details herein, and an operation of the electric vehicle for supplying power will be primarily described below.

Figure 11:
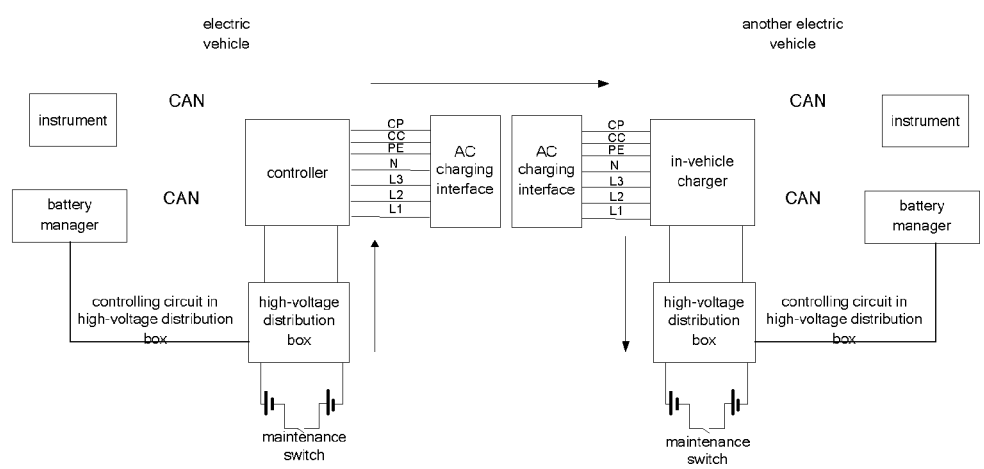
FIG. 11 is a system block diagram of an operating module of a discharging electric vehicle in a solution of V-to-V.

FIG. 11 is a system block diagram of an operating module of a discharging electric vehicle in a solution of V-to-V.

Following operating modules are involved in the V-to-V process. For an electric vehicle for supplying power, the operating modules include an instrument, a battery manager, a high-voltage distribution box, a controller, an AC charging interface and a power battery. For an electric vehicle to be charged, the operating modules include an instrument, an in-vehicle charger, a battery manager, a high-voltage distribution box, an AC charging interface and a power battery.

Specifically, during the V-to-V, following modules are involved into operation: the instrument, the battery manager, the high-voltage distribution box, the controller, the AC charging interface, the power battery, and the in-vehicle charger mounted in the charging electric vehicle. The instrument is configured to sample a discharging switch signal and a discharging mode signal, and to display discharging information and fault information. The battery manager is configured to sample state information of the power battery, to determine whether the power battery is allowed to externally discharge, and to control to connect a power supply circuit in the high-voltage distribution box. The high-voltage distribution box is configured to connect the power battery and the controller, such that the power battery may supply DC to the controller. The controller is configured to emit a PWM wave, and to detect in real-time a connection status between the electric vehicle to be charged and the charging electric vehicle. The controller is communicated with the instrument and the battery manager via the CAN, and the controller inverts the DC supplied by the power battery into an AC and outputs the AC to the electric vehicle to be charged. The AC charging interface is configured to connect the two electric vehicles, i.e. the charging electric vehicle (i.e. the electric vehicle for supplying power) and the electric vehicle to be charged. The power battery is configured to store electric energy and to externally discharge the stored electric energy if it is required. The charging electric vehicle further includes the in-vehicle charger which is communicated with the instrument and the battery manager via the CAN.

Furthermore, during the V-to-V, for the electric vehicle for supplying power needs to be in OK gear, an internal circuit connected to a CP pin of the controller of said electric vehicle needs to be switched so as to emit the PWM wave, the instrument of said electric vehicle needs to determine and process the discharging switch signal and display the discharging state. The electric vehicle to be charged is in OFF gear and enters into a charging mode after a charging gun is inserted, and the instrument of the electric vehicle for supplying power merely displays charging information.

The discharging system for externally outputting a three-phase current is required to integrate a part of the circuit of a charging pile in order to switch the internal circuit connected with the CP pin so as to emit a PWM wave conformance to national standards. A motor driving controller is further expanded in function of inverting the DC into the AC. The improved electric vehicle may charge other electric vehicles as the charging pile. Furthermore, when another electric vehicle is exhausted at a place far away from the charging station, the electric vehicle may temporarily be used as a charging device to charge the exhausted electric vehicle. Thus the problem that electric vehicles are unable to drive on half way due to exhausted electric quantity of the battery may be solved.

A process of the V-to-V may include a preparation period, a discharging period and a discharging finish period.

Figure 12:
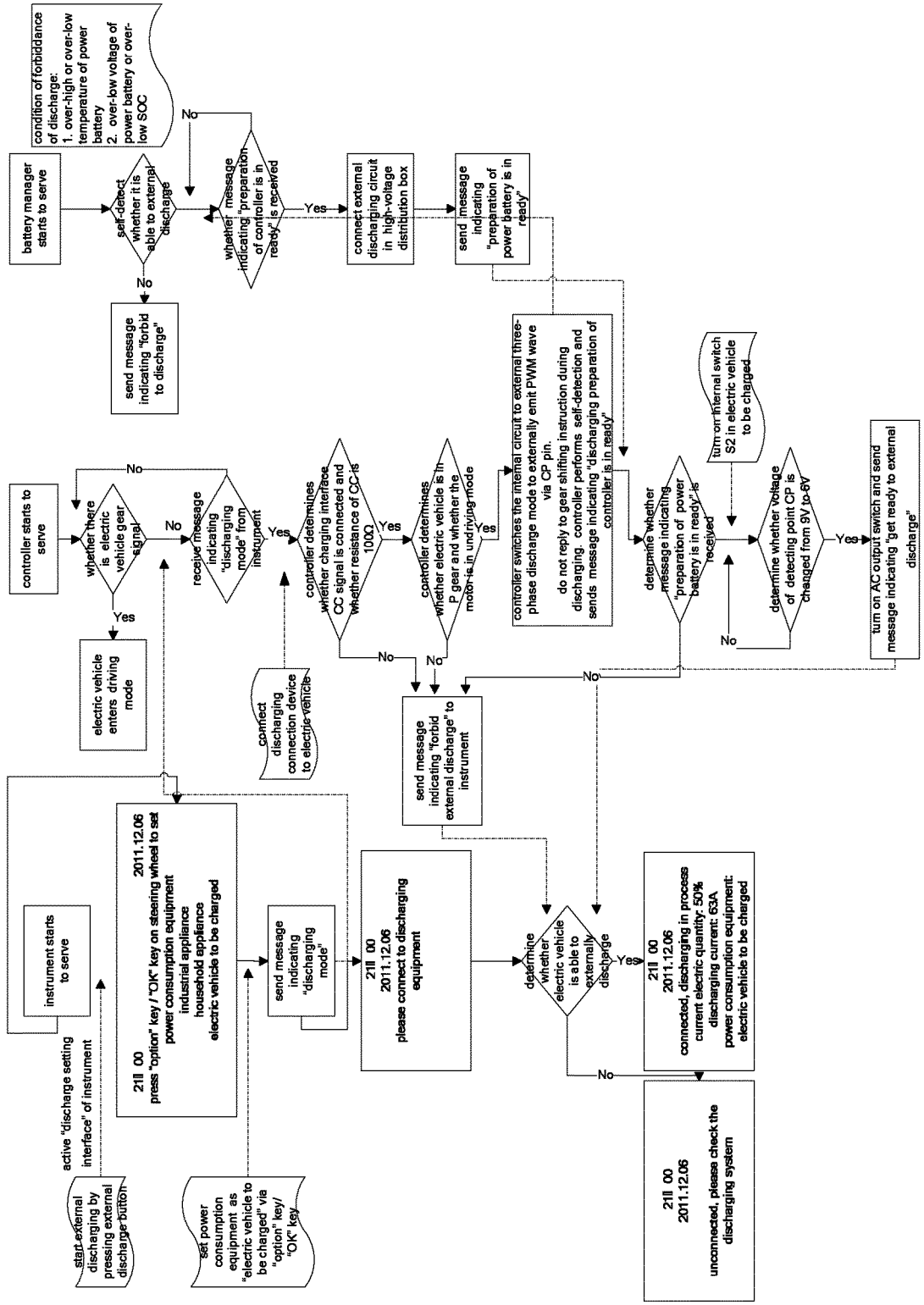
FIG. 12 is a flow chart illustrating operations of modules during a V-to-V discharging preparation period.
Figure 13:
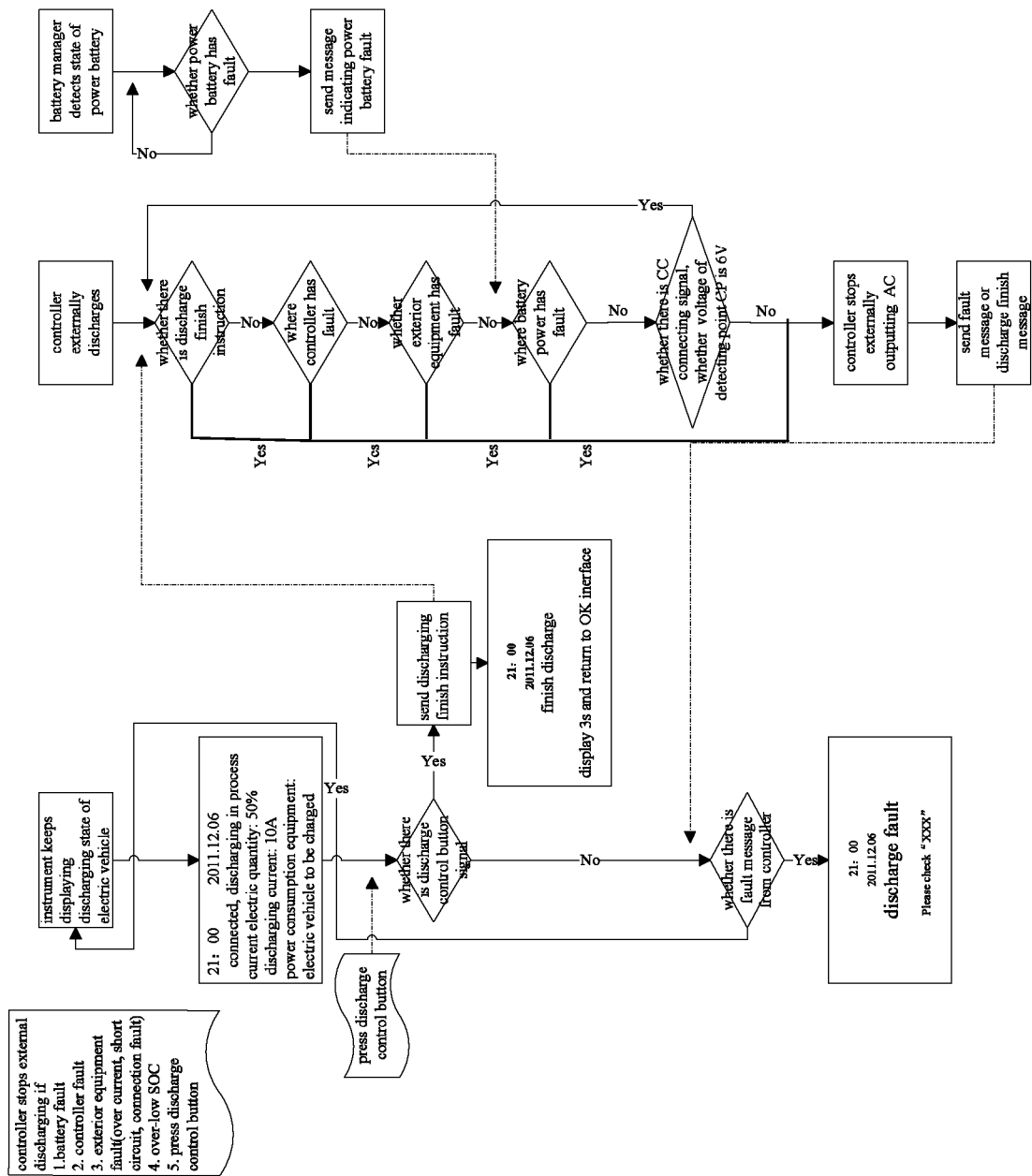
FIG. 13 is a flow chart illustrating operations of modules during a V-to-V discharging period and a V-to-V discharging finish period.

FIG. 12 is a flow chart showing operations of modules during the V-to-V discharging preparation period. FIG. 13 is a flow chart showing operations of the modules during the V-to-V discharging period and the V-to-V discharging finish period.

FIG. 12 is a flow chart showing operations of modules during the V-to-V discharging preparation period. During the V-to-V discharging preparation period, specifically, when the electric vehicle is in OK gear with P gear, the instrument starts to serve. A "discharge setting interface" is activated by pressing an external discharge button on a panel of the instrument, and the power consumption equipment may be set as "electric vehicle to be charged" via an "option" key and an "OK" key on a steering wheel, in which the power consumption equipment may further include an "industrial appliances" and "household appliances". After the discharging mode is set as "discharge to electric vehicle to be charged", the instrument sends a message indicating "discharging mode" to inform the controller and popups a prompt "please connect to discharging equipment". If it is determined that the electric vehicle is able to externally discharge, a prompt is popuped, which includes a current time, date, a connecting state, a current electric quality, a discharging current and the power consumption equipment, for example, 21:00; 2012.12.31; connected, discharging in process; the current electric quantity: 50%; the discharging current: 63 A; the power consumption equipment: electric vehicle to be charged. If it is determined that the electric vehicle is unable to externally discharge, a prompt is popuped indicating 21:00; 2012.12.31; unconnected, please check the discharging system.

Furthermore, when the controller is in service, it is first determined whether there is an electric vehicle gear signal, if yes, the electric vehicle enters the driving mode; and if no, the controller detects a CC signal to determine whether the charging gun is connected to the vehicle after receiving the message indicating "discharging mode" from the instrument. Specifically, the controller needs to determine whether the charging interface CC signal is connected and whether a resistance of CC is 100Ω. If the CC signal is not detected and the resistance of CC is not 100Ω, a message indicating "forbid external discharge" is sent to the instrument. If the CC signal is detected and the resistance of CC is 100Ω, it is further determined whether the electric vehicle is in P gear and whether the motor is in undriving mode. If the electric vehicle is not in P gear and the motor is not in undriving mode, a message indicating "forbid external discharge" is sent to the instrument. If the electric vehicle is in P gear and the motor is in undriving mode, the controller switches the internal circuit thereof to an external discharge mode to externally emit PWM wave via the CP pin. In some embodiments of the present disclosure, specifically, when the electric vehicle is in OK gear with P gear, the "discharge setting interface" is activated by pressing the external discharge button on the panel of the instrument. After the discharging mode is set as "discharge to electric vehicle to be charged", the instrument sends the message to inform the controller and popups the prompt "please connect to discharging equipment". The controller detects the CC signal to determine whether the charging gun is connected to the vehicle after receiving the message from the instrument. After the CC signal is detected, the controller switches the internal circuit for detecting the CP wave to the circuit for emitting the PWM wave (as shown in FIG. 6, a switch S1 in the electric vehicle for power supplying is switched to connect with a lower pin, and a switch S4 in the electric vehicle for power supplying is switched to connect with a lower pin) so as to externally emit the PWM wave, the controller also switches the internal circuit to an external three-phase discharge circuit, and then sends a message indicating "preparation of the controller is in ready".

A gear shifting instruction is not replied during the discharging. The controller performs a self-detection, and if there is no fault, the controller sends a message indicating "discharging preparation of the controller is in ready". It is determined whether a message indicating "preparation of the power battery is in ready" is received, and if yes, it is further determined whether a voltage of a detecting point CP is changed from 9V to 6V, and if yes, the message indicating "preparation of the controller is in ready" is sent, an AC output switch is turned on and a message indicating "get ready to external discharge" is sent. If the message indicating "preparation of the power battery is in ready" is not received, the message indicating "forbid external discharge" is sent to the instrument.

When it starts to work, the battery manager first self-detects whether it is able to external discharge, and if no, a message indicating "forbid to discharge" is sent. A condition of forbiddance of discharge includes any one of an over-high temperature of the power battery, an over-low temperature of the power battery, an over-low voltage of the power battery and an over-low SOC. When receiving the message indicating "preparation of the controller is in ready", the battery manager controls the external discharging circuit in the high-voltage distribution box to be connected and sends the message indicating "preparation of the power battery is in ready".

Furthermore, after receiving the message indicating "preparation of the power battery is in ready", the controller determines whether the voltage of the detecting point CP is changed from 9V to 6V. If yes, the controller connects an external output and gets ready to work, that is, a three-phase AC is externally supplied to another electric vehicle, and a message indicating "start to discharge" is sent.

FIG. 13 is a flow chart showing operations of the modules during the V-to-V discharging period and the V-to-V discharging finish period.

During the V-to-V discharging period and the V-to-V discharging finish period, specifically, the instrument keeps displaying the discharging state of the electric vehicle, the controller keeps detecting whether there is a message indicating "the discharging is finished" from the instrument, whether the controller has a fault, whether there is a CC connecting signal, whether the voltage of the detecting point CP is 6V, whether the power battery has a fault, and the battery manager keeps detecting the state of the power battery.

The controller stops externally outputting the AC if any of following cases occurs. When receiving the message indicating "the discharging is finished" from the instrument, the controller stops externally outputting the AC and sends the message indicating "the discharging is finished", and after receiving the message indicating "the discharging is finished", the battery manager switches an internal circuit in the high-voltage distribution to reset the electric vehicle in OK gear. When receiving a message indicating "a power battery fault" sent from the battery manager, the controller stops externally outputting the AC, and the instrument displays the fault. When detecting is the controller has a fault on itself, the controller stops externally outputting the AC and sends a message indicating "a controller fault", the instrument receives the message indicating "the controller fault" and displays the fault, and the battery manager switches to a corresponding state according to the fault. When receiving a message indicating "an exterior equipment fault", the controller stops externally outputting the AC, and the instrument displays the fault, in which the fault of the exterior equipment includes any one of over current, short circuit, connection fault and a combination thereof. When detecting that the CC connection signal is disconnected, the controller stops externally outputting the AC and sends a message indicating "a connection fault". When detecting that the CP connection signal is changed from 9V to 6V, which means that the another electric vehicle to be charged has been fully charged, the controller stops externally outputting the AC and sends a message indicating "the discharging is finished", and after receiving the message indicating "the discharging is finished", the battery manager switches the internal circuit in the high-voltage distribution to reset the electric vehicle in OK gear.

Furthermore, during the external discharging, the controller stops externally outputting the AC if any of following cases occurs: SOC of the power battery is over-low, and a discharge control button is pressed to terminate external discharging.

The discharging apparatus for the electric vehicle according to embodiments of the present disclosure is set at a normal charging mode and holds for an external connection and power supply. The another electric vehicle to be charged is in OFF gear, while the electric vehicle for supplying power needs to be in OK gear with P gear and is set at a mode of discharging to another electric vehicle to be charged. Then the controller of the electric vehicle switches to a charging pile state to supply power to another electric vehicle after connection. The discharging apparatus for the electric vehicle broadens an application range of electric vehicles, such that the electric vehicle may temporarily be used as a charging device to charge an electric vehicle with insufficient or exhausted energy. Thus the problem that electric vehicles are unable to drive on half way due to insufficient or exhausted electric quantity of the battery may be solved.

The present disclosure further provides an electric vehicle. The electric vehicle includes the discharging apparatus 100 for the electric vehicle according to embodiments of the present disclosure.

The electric vehicle for the electric vehicle according to embodiments of the present disclosure is set at a normal charging mode and holds for an external connection and power supply. The another electric vehicle to be charged is in OFF gear, while the electric vehicle for supplying power needs to be in OK gear with P gear and is set at a mode of discharging to another electric vehicle to be charged. Then the controller of the electric vehicle switches to a charging pile state to supply power to another electric vehicle after connection. The electric vehicle broadens an application range of electric vehicles, such that the electric vehicle may temporarily replace a charging device to charge an electric vehicle with insufficient or exhausted energy. Thus the problem that electric vehicles are unable to drive on half way due to insufficient or exhausted electric quantity of the battery may be solved.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A discharging apparatus for an electric vehicle, comprising:
an AC charging interface;
a charging connection device, having a first terminal connected with the AC charging interface of the electric vehicle and a second terminal connected with another electric vehicle, and configured to transmit an AC output from the AC charging interface to the another electric vehicle;

an instrument, configured to send a discharging preparation instruction after receiving a trigger signal;

a controller, configured to communicate with the instrument and to detect whether the charging connection device is connected with the AC charging interface after receiving the discharging preparation instruction, and if yes, to emit a PWM wave and to switch to an external discharging mode;

a battery manager, configured to communicate with the controller and to control an external discharging circuit in a high-voltage distribution box of the electric vehicle after the controller switches to the external discharging mode;

a power battery, connected with the high-voltage distribution box and configured to provide a DC via the external discharging circuit in the high-voltage distribution box, wherein the controller is configured to detect whether the other electric vehicle is fully charged, and if no, the controller converts the DC provided by the external discharging circuit into the AC and to output the AC to the AC charging interface so as to discharge to the other electric vehicle;

the controller is further configured to detect whether the electric vehicle is currently in a P gear after it is determined that the charging connection device is connected with the AC charging interface, and if yes, the controller switches to the external discharging mode; and the instrument is further configured to, when the electric vehicle is in the P gear, activate a discharging setting interface through a panel of the instrument, and to send the discharging preparation instruction to the controller after power consumption equipment of the external discharging mode is set to an electric vehicle, among a plurality of external discharging equipment types, via the discharging setting interface.

2. The discharging apparatus for an electric vehicle according to claim 1, wherein the instrument and the controller communicate via a CAN bus of a local area network of the controller, and the controller and the battery manager communicate via the CAN bus.

3. The discharging apparatus for an electric vehicle according to claim 1, wherein the charging connection device comprises:
a first charging gun, located at the first terminal of the charging connection device and connected with the AC charging interface of the electric vehicle;
a second charging gun, located at the second terminal of the charging connection device and connected with an AC charging interface of the other electric vehicle.

4. The discharging apparatus for an electric vehicle according to claim 1, wherein after it is determined that the charging connection device is connected with the AC charging interface, the controller emits the PWM wave via a CP pin.

5. The discharging apparatus for an electric vehicle according to claim 1, wherein the controller is configured to determine whether an electric vehicle is fully charged by detecting a voltage of a CP pin, and if the voltage of the CP pin reaches a predetermined voltage, it is determined that the other electric vehicle has been fully charged.

6. The discharging apparatus for an electric vehicle according to claim 5, wherein the predetermined voltage is 6V.

7. The discharging apparatus for an electric vehicle according to claim 1, wherein the controller is further configured to detect in real-time whether an internal circuit of the controller has a fault and to detect in real-time whether the other electric vehicle has a fault during discharging.

8. The discharging apparatus for an electric vehicle according to claim 7, wherein the controller is further configured to stop outputting the AC if it is determined that the internal circuit has a fault and/or the other electric vehicle has a fault.

9. The discharging apparatus for an electric vehicle according to claim 1, wherein the battery manager is further configured to detect in real-time a current electric quantity of the power battery and to detect in real-time whether the power battery has a fault, if it is determined the power battery has a fault, the battery manager sends a battery fault instruction to the controller, and the controller stops outputting the AC after receiving the battery fault instruction.

10. The discharging apparatus for an electric vehicle according to claim 1, wherein the controller is further configured to stop outputting the AC after receiving a discharging finish instruction from the instrument.

11. The discharging apparatus for an electric vehicle according to claim 1, wherein the controller is further configured to detect a current discharging current in real-time.

12. The discharging apparatus for an electric vehicle according to claim 1, wherein the controller is further configured to stop outputting the AC, if it is determined that the charging connection device is disconnected with the AC charging interface or when the other electric vehicle is fully charged.

13. The discharging apparatus for an electric vehicle according to claim 1, wherein the controller is further configured to detect whether an electric quantity of the electric vehicle is greater than a predetermined value, and if yes, it is determined to allow the electric vehicle to externally discharge.

14. An electric vehicle, comprising a discharging apparatus for an electric vehicle, the discharging apparatus for an electric vehicle comprising:
an AC charging interface;
a charging connection device, having a first terminal connected with the AC charging interface of the electric vehicle and a second terminal connected with another electric vehicle, and configured to transmit an AC output from the AC charging interface to the other electric vehicle;
an instrument, configured to send a discharging preparation instruction after receiving a trigger signal;
a controller, configured to communicate with the instrument and to detect whether the charging connection device is connected with the AC charging interface after receiving the discharging preparation instruction, and if yes, to emit a PWM wave and to switch to an external discharging mode;
a battery manager, configured to communicate with the controller and to control an external discharging circuit in a high-voltage distribution box of the electric vehicle to be connected after the controller switches to the external discharging mode;
a power battery, connected with the high-voltage distribution box and configured to provide a DC via the external discharging circuit in the high-voltage distribution box,
wherein the controller is configured to detect whether the other electric vehicle is fully charged, and if no, the controller converts the DC provided by the external discharging circuit into the AC and to output the AC to the AC charging interface so as to discharge to the other electric vehicle;

the controller is further configured to detect whether the electric vehicle is currently in a P gear after it is determined that the charging connection device is connected with the AC charging interface, and if yes, the controller switches to the external discharging mode; and the instrument is further configured to, when the electric vehicle is in the P gear, activate a discharging setting interface through a panel of the instrument, and to send the discharging preparation instruction to the controller after power consumption equipment of the external discharging mode is set to an electric vehicle, among a plurality of external discharging equipment types, via the discharging setting interface.

15. The electric vehicle according to claim 14, wherein after it is determined that the charging connection device is connected with the AC charging interface, the controller emits the PWM wave via a CP pin.

16. The electric vehicle according to claim 14, wherein the controller is configured to determine whether the other electric vehicle is fully charged by detecting a voltage of a CP pin, and if the voltage of the CP pin reaches a predetermined voltage, it is determined that the other electric vehicle has been fully charged.

17. The electric vehicle according to claim 14, wherein the controller is further configured to detect in real-time whether an internal circuit of the controller has a fault and to detect in real-time whether the other electric vehicle has a fault during discharging.

18. The electric vehicle according to claim 17, wherein the controller is further configured to stop outputting the AC if it is determined that the internal circuit has a fault and/or the other electric vehicle has a fault.

19. The discharging apparatus for an electric vehicle according to claim 1, wherein the instrument is further configured to display a prompt for connecting to the discharging equipment of the other electric vehicle.

20. The discharging apparatus for an electric vehicle according to claim 1, wherein the instrument is further configured to display discharging information including a current time, a current date, a connecting state, a current electric quality, a discharging current, and the power consumption equipment.

* * * * *